(12) United States Patent
Springston et al.

(10) Patent No.: US 7,220,222 B2
(45) Date of Patent: May 22, 2007

(54) CART FOR DIE TRANSPORTATION

(75) Inventors: Eric D. Springston, York, SC (US); John R. Pratt, Charlotte, NC (US); Dale A. Williams, Fort Mill, SC (US)

(73) Assignee: Multi-Shifter Inc., Charlotte, NC (US)

( * ) Notice: Subject to any disclaimer, the term of this patent is extended or adjusted under 35 U.S.C. 154(b) by 0 days.

(21) Appl. No.: 11/271,376

(22) Filed: Nov. 10, 2005

(65) Prior Publication Data

US 2006/0160684 A1   Jul. 20, 2006

Related U.S. Application Data

(60) Provisional application No. 60/679,059, filed on May 9, 2005, provisional application No. 60/644,900, filed on Jan. 19, 2005.

(51) Int. Cl.
*B23Q 3/155* (2006.01)
(52) U.S. Cl. .............................. 483/28; 483/1; 414/471
(58) Field of Classification Search ................ 483/1, 483/28, 29; 414/471, 495; 100/918
See application file for complete search history.

(56) References Cited

U.S. PATENT DOCUMENTS

| | | | | |
|---|---|---|---|---|
| 3,154,979 A | * | 11/1964 | Crispin | ......................... 29/34 B |
| 4,514,133 A | | 4/1985 | Vercruysse | |
| 4,587,716 A | * | 5/1986 | Bytow | ........................... 483/29 |
| 4,614,108 A | | 9/1986 | Bolle et al. | |
| 4,635,465 A | | 1/1987 | Ashelman, Jr. et al. | |
| 4,649,622 A | * | 3/1987 | Scott | ............................ 483/29 |
| 4,660,406 A | | 4/1987 | Rugh et al. | |
| 4,750,579 A | | 6/1988 | Jarl et al. | |
| 4,966,080 A | * | 10/1990 | Teissier et al. | ............. 104/289 |
| 5,040,404 A | | 8/1991 | Henderson et al. | |

(Continued)

FOREIGN PATENT DOCUMENTS

DE   8112671   6/1983

(Continued)

OTHER PUBLICATIONS

Multi-Level M-S Vehicles; Raise Your Expectations!; 2 pages; available at <http://www.multi-shifter.com/web16.htm> (visited May 2, 2005).

(Continued)

*Primary Examiner*—Dana Ross
(74) *Attorney, Agent, or Firm*—Alston & Bird LLP

(57) ABSTRACT

There is provided a cart for transporting dies, molds, and similar objects. The cart includes a lift mechanism for raising and lowering a support surface to the height of the surface onto which or from which the die will be moved. The support surface includes a transfer mechanism for coupling to the die, either with an electromagnet or a suction device, to thereby slide the die as desired without damaging critical components on the exterior of the die. The cart also includes a motorized drive wheel assembly which provides a drive force in a forward or backward direction to assist the operator in moving a die that has been transferred onto the cart. The cart is powered by one or more rechargeable batteries. The cart enables a single operator to safely and conveniently remove, insert, and transport dies or other similar objects.

22 Claims, 11 Drawing Sheets

U.S. PATENT DOCUMENTS

| | | | |
|---|---|---|---|
| 5,074,143 | A | 12/1991 | Nolan et al. |
| 5,113,960 | A | 5/1992 | Prinz |
| 5,466,207 | A * | 11/1995 | Arens .................. 483/28 |
| 5,580,581 | A | 12/1996 | Buehning |
| 5,619,913 | A | 4/1997 | Padovani |
| 5,755,653 | A * | 5/1998 | Nishida .................. 483/28 |
| 6,200,245 | B1 | 3/2001 | Dodo et al. |
| 6,343,665 | B1 | 2/2002 | Eberlein et al. |
| 6,543,983 | B1 | 4/2003 | Felder et al. |
| 6,682,333 | B2 | 1/2004 | Ulcej et al. |
| 6,726,610 | B2 * | 4/2004 | Graham et al. ............ 483/28 |
| 2004/0035636 | A1 | 2/2004 | Julien |

FOREIGN PATENT DOCUMENTS

| | | |
|---|---|---|
| DE | 3620964 | 1/1988 |
| DE | 4225919 | 12/1993 |
| FR | 2533482 | 3/1984 |
| GB | 2263085 | 7/1993 |
| JP | 2000279461 | 10/2000 |

OTHER PUBLICATIONS

Single Level M-S Vehicles; BIG changes happen in as little as 2 minutes!; 2 pages; available at <http://www.multi-shifter.com/web15.htm> (visited May 2, 2005).

Mobile-Shifter Battery Changer; High Performance, Low Price!! Multi-Shifter's Mobile Shifter; 2 pages; available at <http://www.multi-shifter.com/Web-32.htm> (visited May 2, 2005).

Battery Handling Systems; Horizontal Transfer Equipment; Automatic Transfer Carriage Model ATC; 4 pages.

Copy of International Search Report for PCT/US2006/001825 mailed May 29, 2006.

Copy of the International Search Report and Written Opinion for International Application No. PCT/US2006/017236.

* cited by examiner

CART FOR DIE TRANSPORTATION

CROSS REFERENCE TO RELATED APPLICATION

The present application claims priority pursuant to 35 U.S.C. 119(e) to U.S. Provisional Application Ser. No. 60/679,059, filed May 9, 2005 and U.S. Provisional Application Ser. No. 60/644,900, filed Jan. 19, 2005.

BACKGROUND OF THE INVENTION

1. Field of the Invention

The present invention is related to carts for material handling, and more particularly, to carts that assist in transporting dies or molds.

2. Description of Related Art

Dies or molds are used in various industries for the blow-molding or injection-molding of components, such as plastic components. Dies typically comprise two or more blocks of alloy steel or other suitable metal or material that are connected such that one block may be moved in at least one direction, typically vertically, relative to the other block. The mating surfaces of the blocks define a die cavity with contours of the one or more components that are molded within the die. Dies also typically include miscellaneous hoses and connectors along the edges of the die to facilitate the ingress of materials used to fabricate the component as well as the ingress and egress of other materials, such as coolants, through the die. Dies may also include guide pins, such as dowel pins or the like for aligning the two or more blocks of the die, that protrude beyond the blocks of the dies.

Dies are typically interchangeable in the corresponding machinery, such as hydraulic presses, that utilize the dies to make the molded components. Dies must be removed to be repaired or replaced when damaged. Dies are also selectively removed from the machinery so that the machinery is capable of producing components of various shapes, materials, or other parameters. Therefore, dies frequently define substantially similar outer shapes to be interchangeable, while the die cavities define substantially dissimilar shapes. Because such dies weigh upwards of 1,000 lbs or more, moving these dies into and out of the corresponding machinery can be labor intensive, difficult, and possibly dangerous. Therefore, a need exists for a device that provides convenient removal and insertion of dies into the corresponding machinery.

Because the hoses, connectors, guide pins, and other portions on the exterior of the die should not be damaged during the transport of the die, handling the dies can be very awkward because of the limited number of surfaces that can be contacted. Furthermore, dies are typically transported as a complete assembly, rather than by individual blocks, to minimize the possibility of damaging the mating surfaces of the die or the surfaces of the die cavity. Therefore, a further need exists for a device that conveniently removes and transports dies while minimizing the likelihood that the die will be damaged.

BRIEF SUMMARY OF THE INVENTION

The present invention addresses the above needs and achieves other advantages by providing a cart for transporting dies, in which the cart includes an electromagnet. The cart comprises a cart frame having one or more wheels for allowing the cart frame to move adjacent to or away from a die press to or from which the die is to be transferred. One embodiment of the cart includes a motorized drive wheel assembly to facilitate movement of the cart. The cart also includes a support surface connected to the cart frame and structured to support the weight of at least one die. The cart further includes a control assembly and a transfer mechanism such that the transfer mechanism is capable of moving the die to or from the die press when the transfer mechanism is engaged with the die. The electromagnet is operatively connected to the transfer mechanism and the control assembly and is capable of selectively magnetically engaging a metallic component of a die in response to the control assembly, such that the die can be transferred from or to the support surface relative to the die press. One embodiment of the cart includes a lift mechanism capable of raising and lowering the support surface relative to the cart frame. The transfer mechanism of a further embodiment of the cart includes an arm from which the electromagnet is cantilevered and an electric motor for moving the electromagnet relative to the support structure. Still further embodiments of the present invention comprise additional and alternative features.

The present invention also provides a cart for transporting dies, in which the cart is capable of moving the die in both a generally longitudinal direction and a generally lateral direction. The cart comprises a cart frame having one or more wheels for allowing the cart frame to move adjacent to or away from the die press to or from which the die is to be transferred. The cart also includes a support surface connected to the cart frame and structured to support the weight of at least one die, wherein the support surface defines a generally longitudinal direction and defines a generally lateral direction. The cart further includes a control assembly and a transfer mechanism connected to the cart frame and structured to move a die to or from the die press in both a generally longitudinal direction and a generally lateral direction.

The present invention further provides a cart for transporting dies, in which the cart includes a suction device. The cart comprises a cart frame having one or more wheels for allowing the cart frame to move adjacent to or away from the die press to or from which the die is to be transferred. The cart also includes a support surface connected to the cart frame and structured to support the weight of at least one die. The cart further includes a control assembly and a transfer mechanism such that the transfer mechanism is capable of moving the die to or from the die press when the transfer mechanism is engaged with the die. The suction device is operatively connected to the transfer mechanism and the control assembly and is capable of selectively engaging a die in response to the control assembly, such that the die can be transferred from or to the support surface relative to the die press. The transfer mechanism of one embodiment of the cart includes an arm from which the suction device is cantilevered.

A method of transferring a die to or from a die press is also provided by the present invention. To transfer the die, the cart is moved adjacent to the die and the die is engaged or grabbed with an electromagnet that is operatively connected to a transfer mechanism and a control assembly. One embodiment of the method comprises raising a support surface of the cart until the support surface is substantially level with a surface of the die press on which the die is positioned prior to transferring the die onto support surface. The electromagnet is capable of selectively magnetically engaging a metallic component of a die in response to the control assembly. The die is then transferred onto the support surface until the die is completely supported by the support surface. When being transferred onto the support surface, the die may be transferred in both a generally longitudinal direction and a generally lateral direction, according to at least one embodiment of the method for transferring a die.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION OF THE INVENTION

Figure 1:
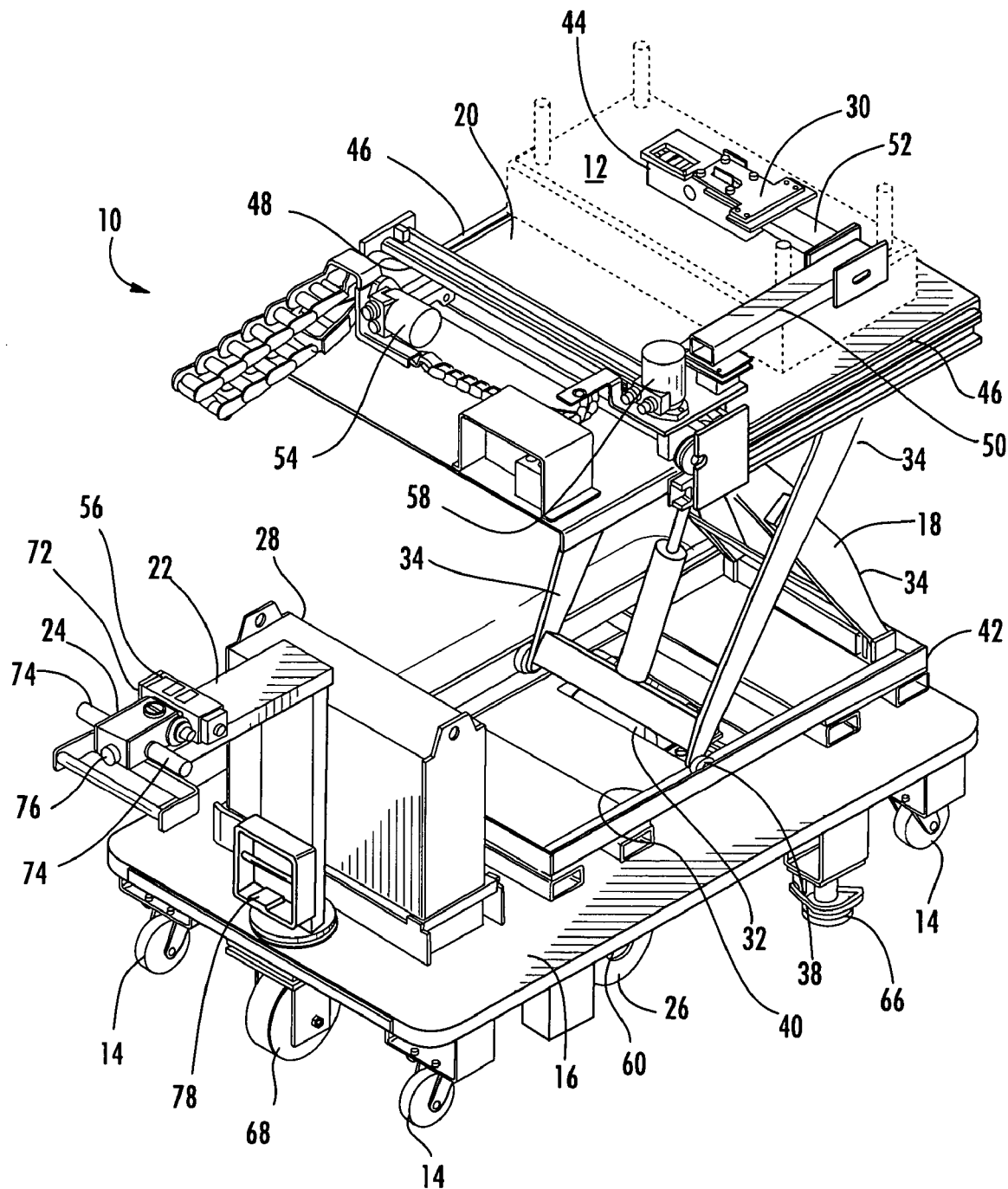
FIG. 1 is a perspective view of a cart of one embodiment of the present invention, illustrating the support surface in the upward position and supporting a die.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1–5, a cart in accordance with one embodiment of the present invention is illustrated. The cart 10 of FIGS. 1–5 is specifically configured for use with die 12 or other similar molds. Further embodiments of the present invention include carts having alternative configurations for other specific applications, such as transporting similar components in a manufacturing environment or the like, or for other general applications. Accordingly, the motorized drive wheel assembly, the lift mechanism, the control assembly, the mechanical feet, the electromagnet, and the other portions of the cart of the present invention may define alternative relative shapes, locations, and configurations corresponding to the intended use of the cart.

Referring now to FIGS. 1–5, the cart 10 comprises two or more wheels 14, such as four wheels, located at the corners of the cart. The wheels 14 may be any type of device that facilitates movement of the cart, such as casters, rollers, or the like, and are able to pivot to facilitate steering of the cart 10. The wheels 14 are attached to the cart frame 16 by brackets that are preferably sized to receive the lift prongs of fork trucks or the like. The cart 10 also includes a lift mechanism 18 that includes a support surface 20 for supporting the die 12 to be transported. The support surface 20 is structured to support the weight of the die, such as being capable of supporting over 1,000 pounds, to list a non-limiting example of weight capacity. The cart frame 16 defines opposing longitudinal sides and opposing lateral sides of any relative lengths, though in the illustrated embodiments the longitudinal sides are longer than the lateral sides.

The cart 10 also includes an upright 22 onto which a control assembly 24 is mounted. The upright 22 of FIGS. 1–5 defines a substantially right-angle that projects generally upward and then generally longitudinal toward the operator. The uprights 22 are configured to minimize the likelihood that the operator will unintentionally hit the cart with his or her legs or feet. Further embodiments of the present invention include uprights that define an angle or one or more curves for ergonomic purposes. The control assembly 24 is advantageously mounted at such a height that is ergonomically convenient for operators of the cart 10. The control assembly 24 includes controls for activating a lift mechanism 18, which raises and lowers the support surface 20 of the cart 10, and for operating a motorized drive wheel assembly 26, which provides forward or reverse motion to the cart during operation. The motorized drive wheel assembly 26 of the cart 10 is powered by one or more batteries 28 that may be mounted on top of the cart frame 16, as illustrated, or below the cart frame. The battery 28 is preferably removed from the cart 10 for recharging; however, further embodiments of the cart include batteries that can be recharged as needed by plugging in a retractable plug provided on the cart. The battery 28 also powers the lift mechanism 18 and the transfer mechanism 30 provided on the support surface 20. As described more fully below, an operator of the cart 10 is therefore able to conveniently move a die 12 on or off the support surface 20, raise or lower the support surface, and transport the die by simply adjusting the controls on the control assembly 24.

To move a die 12 onto the support surface 20, the cart 10 is positioned adjacent the machinery on which the die is positioned (not shown) or other structure that supports the die. When the operator activates a lift switch on the control assembly 24, the lift mechanism 18 continuously raises the support surface 20 until the operator deactivates the lift switch when the support surface is at a height substantially level with the surface on which the die 12 is positioned or is to be positioned, which is preferably less than the maximum possible height of the support surface. The support surface of some embodiments of the cart includes a pin (not shown) or other locating device protruding from an edge of the support surface, such that the support surface is raised above the height of the surface on which the die is positioned or is to be positioned, the cart is moved laterally and/or longitudinally such that the pin or other locating device extends beyond the edge of the surface on which the die is positioned or is to be positioned, and then the support surface is lowered until the pin or other locating device contacts the surface thereby indicating that the support surface of the cart is level with the surface on which the die is positioned or is to be positioned. However, further embodiments of the present invention may not include a pin or other locating device, such that the operator moves the support surface of the cart to be substantially level with the surface on which the die is positioned or is to be positioned.

The lift mechanism 18 illustrated in FIG. 1 includes a hydraulic pump 32 under the cart frame 16 which is in electrical communication with the lift switch of the control assembly 24. The hydraulic pump 32 drives one or more hydraulic cylinders mounted underneath the support surface 20 which longitudinally move one of the two bars 34 of each of the two scissor-like linkages 36 of the lift mechanism 18. As shown in FIG. 1, one end of each bar 34 includes a roller 38 that longitudinally slides within a corresponding rail 40 and an opposite end 42 of each bar is connected to the respective cart frame 16 or support surface 20 to thereby allow the support surface to rise generally orthogonally with respect to the cart frame, while remaining generally parallel with the cart frame. Further embodiments of the present invention provide alternative devices for raising and lowering the support surface of the cart.

The support surface 20 defines a substantially flat surface onto which one or more dies may be placed during transport of the die(s). The support surface 20 of the illustrated embodiments is a metal surface that is relatively smooth to allow metal-on-metal sliding of the die on the support surface during transfer of the die. Alternative embodiments of the present invention may define alternative materials for the support surface. The transfer mechanism 30 is also provided on the support surface 20 to facilitate transfer of the die 12, such as loading and unloading of the die, to list one non-limiting example of transferring the die. The transfer mechanism 30 comprises an electromagnet 44 that is supported, and preferably cantilevered, by a series of linear rails 46 and 48 and arms 50 and 52. The electromagnet 44 of the illustrated embodiments includes up to 1,500 pounds or more of pulling force and is similar to the electromagnet used in the battery replacement devices, such as the Mobile Shifter, the Single Level vehicle, and the Multi-Level vehicle, sold by Multi-Shifter, Inc. of Charlotte, N.C., the assignee of the present application. Further embodiments of the present invention provide alternative electromagnets. In addition, still further embodiments of the present invention include alternative devices for coupling to the die when transferring the die, such as the suction device of the embodiment of FIG. 11, as described more fully below.

The linear rails 46 and 48 of the transfer mechanism 30 each include a groove in which a slider linearly moves when a gear mechanically connected to the respective slider is rotated relative to a rack on the respective linear rail, as known in the art. The first linear rails 46 and the corresponding gears and sliders provide longitudinal movement for the electromagnet 44, relative to the support surface 20. A first electric motor 54, which is mechanically connected to the second linear rail 48, is provided to rotate each gear a substantially equal amount to thereby longitudinally move the second linear rail and the portions of the transfer mechanism 30 supported therefrom. The first electric motor 54 is controlled by a controller 56 of the control assembly 24, as discussed more fully below. Similarly, a second electric motor 58, which is mechanically connected to the first arm 50, is provided to rotate a gear to thereby laterally move the first arm 50 and the portions of the transfer mechanism 30 supported therefrom. Further embodiments of the present invention include alternative first and second motors, such as hydraulic motors to list one non-limiting example, to move the first and second arms, respectively. Therefore, the electromagnet 44 can be moved relative to the support surface 20 within a plane proportionate to the longitudinal lengths of the first linear rails 46 and the lateral length of the second linear rail 48.

The transfer mechanism 30 of FIGS. 1–5 includes a first arm 50 that extends longitudinally from an end that is mechanically connected to the second electric motor 58. A second arm 52 extends laterally approximately half the length of the second linear rail 48 from an end of the first arm opposite the end that is mechanically connected to the second electric motor 58. Further embodiments of the present invention include a first arm 150 that extends longitudinally and a second arm 152 that extends laterally as illustrated in the second embodiment of FIGS. 6–10, and still further embodiments of the present invention include arms that extend at an angle to the longitudinal or lateral directions or include three or more arms or a unitary curved arm or the like. Referring again to FIGS. 1–5, the first arm 50 and second arm 52 define selectively adjustable attachments such that the operator can reconfigure the first and second arms in any sequence, such as the second arm connected to the second motor and the first arm connected to the electromagnet, to list one non-limiting example, to facilitate transferring of dies from any side of the cart 10. Referring again to FIGS. 1–5, the electromagnet 44 is connected to an end of the second arm 52 opposite the end that is connected to the first arm 50. The electromagnet 44 may be any electromagnet known in the art that provides a sufficient amount of magnetic coupling to allow the die to be moved by sliding. The first and second arms 50 and 52, or the connections thereto, may include portions that slightly slope upwards as the arms extend from the second electric motor 58 to the electromagnet 44, such that a lower surface of the electromagnet defines a height that is greater than a height of the die for which the cart is to transport, to thereby allow the electromagnet to be positioned above the die. However, the portion of the arms and/or connections providing the slope is relatively flexible to allow the electromagnet 44 to lower to a height equal to the height of the die, and thereby contact the die, when the electromagnet is activated to engage or grab the die, as explained more fully below.

Once the electromagnet 44 has engaged the die, the first and second electric motors 54 and 58 may be controlled by controller 56 to slide the die 12 onto or off of the support surface 20, after which the support surface is lowered and the cart may be moved away; however, in the embodiments of the present invention that include the pin or other locating device, the support surface is preferably lifted a slight amount, the cart is moved away a sufficient distance and then the support surface is lowered before the cart is moved further. The electromagnet 44 may be deactivated, also using the controller 56, once the die 12 has been successfully positioned in the machinery or on an appropriate surface or the die has been successfully positioned on the support surface 20 for transport. Further embodiments of the present invention may keep the electromagnet 44 powered during transport of the die 12 to decrease the likelihood that the die would shift or fall during transport.

Figure 2:
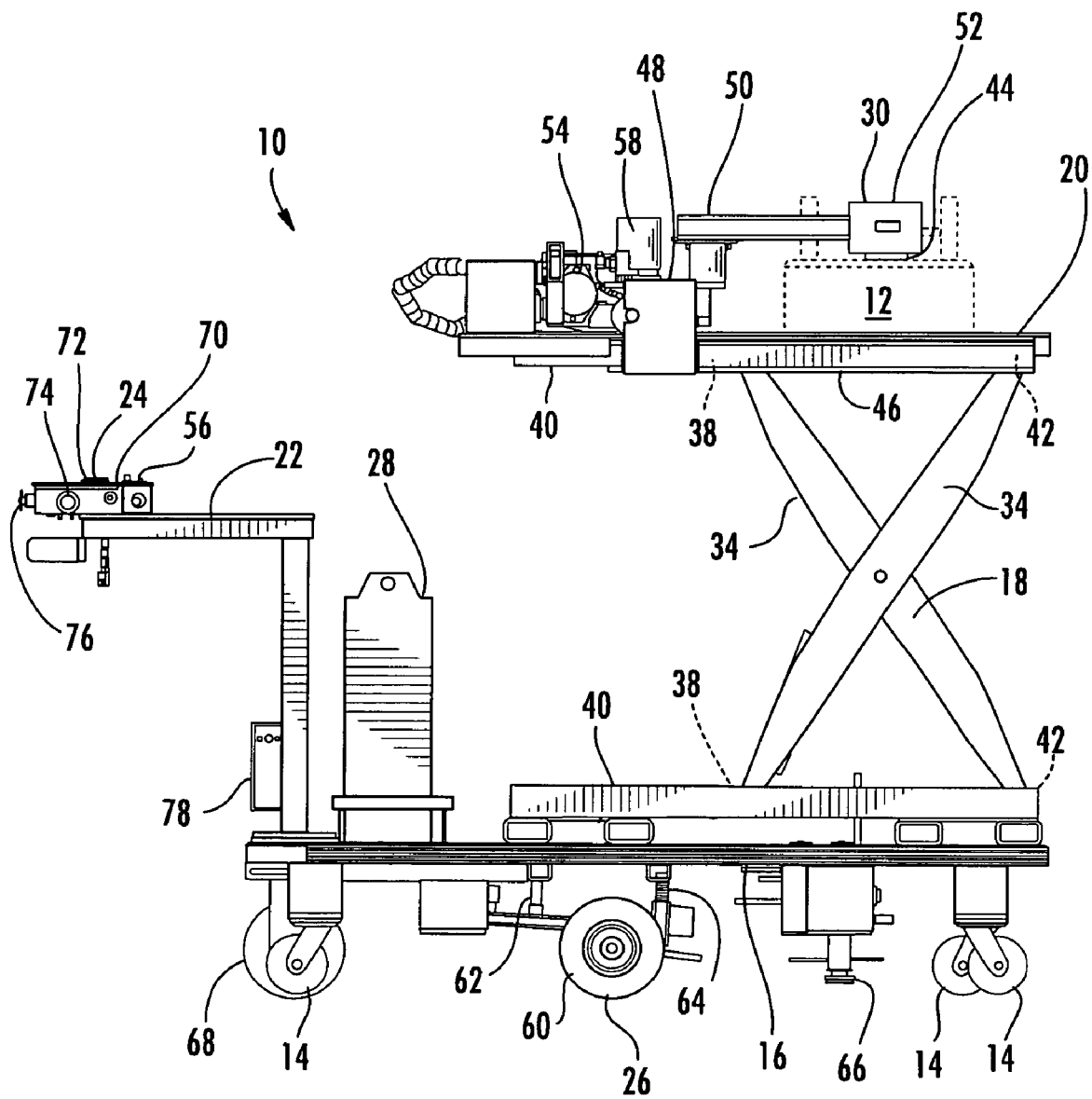
FIG. 2 is a side elevational view of the cart of FIG. 1, illustrating a motorized drive wheel and a mechanical foot.

To assist in the movement of the cart 10, the motorized drive wheel assembly 26, as shown in FIG. 2, includes a drive motor (not shown) that is capable of bidirectional rotation to provide forward and reverse motion to the cart. The drive motor is in electrical communication with control handles of the control assembly 24. The drive motor also includes an electromechanical brake attached to an end of the drive motor. The electromechanical brake locks the drive motor in place when the cart 10 is turned on but the operator is not driving the cart forward or backward. The electromechanical brake also locks the motor in place when a stop switch on the control assembly 24 is pressed, as described more fully below. To drive the cart during normal operation, the drive motor may include any combination of sprockets, chains, gearboxes, differentials, or the like. A differential is preferably connected by individual shafts to the respective drive wheels 60. By providing a differential, as opposed to a transaxle, the motorized drive wheel assembly 26 of the cart 10 of the present invention enables the drive wheels 60 to rotate at different relative speeds, thus providing improved maneuverability of the cart particularly during sharp turns. In particular, the drive wheels 60 are positioned at or near the center of the longitudinal length of the cart 10 so that the cart can pivot fully about its central axis, thus decreasing the amount of room necessary to turn the cart. The drive wheels 60 include foam-filled or inflated rubber tires to provide an amount of shock absorption.

The motorized drive wheel assembly 26 of the cart 10 is attached to the cart frame 16 by pins 62, as shown in FIG. 2. The pins 62 allow the motorized drive wheel assembly 26 to pivot about the pins such that the drive wheels 60 are free to move upwards and downwards relative to the cart wheels 14. Although the illustrated embodiments of the present invention are intended for use on substantially flat surfaces only, further embodiments of the motorized drive wheel assembly of the present invention may include at least one weight on that is cantilevered beyond the drive wheels, relative to the pins, so that the drive wheels will maintain contact with the ground with enough normal force to provide a drive force to the cart if the ground or other surface below the drive wheels is relatively lower than the ground or surface below the cart wheels. The motorized drive wheel assembly 26 further includes springs 64 (as shown on FIG. 2) connecting the cantilevered end of the assembly to the cart frame 16 to dampen the vertical motion of the drive wheels 60 relative to the cart wheels 14. Further embodiments of the cart of the present invention include alternative components and configurations for driving the drive wheels and for allowing vertical motion of the drive wheels relative to the cart wheels when necessary.

The cart 10 also includes a transmission switch for selectively disengaging the drive motor from the drive wheels 60. By disengaging the drive motor from the drive wheels 60, the operator is able to push or pull the cart freely without the drive motor affecting the rotation of the drive wheels. Disengaging the drive motor is particularly useful when the battery 28 has died or has insufficient power to drive the cart 10 or when the operator intends to preserve the battery power, to list two non-limiting reasons to disengage the drive motor. Further embodiments of the cart include alternative devices for allowing the drive wheels to rotate free of the drive motor.

The cart 10 further includes one or more feet 66 connected to the underside of the cart frame 16, as shown in FIGS. 1–2. The foot 66 is connected to the cart frame 16 such that it is vertically movable, relative to the cart frame, to selectively engage the ground and to be locked in the downward position (not shown) and thus stabilizing the cart 10. The increased stability provided by the foot 66 is particularly advantageous when the transfer mechanism 30 is sliding a die onto or off of the cart 10 because the foot prevents the cart from tipping, sliding, or otherwise moving. The foot 66 of the illustrated embodiment is moved up or down preferably by a mechanical lever, threaded bolt, or the like (not shown); however, further embodiments of the present invention may include one or more feet that move automatically using a motor or the like either automatically when the transfer mechanism is operated or manually when the operator uses a control in the control assembly.

The control assembly 24 for controlling the motorized drive wheel assembly 26, the lift mechanism 18, the transfer mechanism 30, and other portions of the cart 10 is mounted at an end of the upright 22 opposite the cart frame 16. The upright 22 of FIGS. 1–5 is pivotable relative to the cart frame 16 and is mechanically connected to a steerable wheel 68 that is below the cart frame and that moves in concert with the upright and control assembly. The steerable wheel 68 is positioned so that it contacts the ground along with the wheels 14 and drive wheels 60, but supports a sufficient amount of weight to allow an operator to conveniently steer the cart both when the motorized drive wheel assembly 26 is in operation or is disengaged. The steerable wheel 68 can be inflatable and the wheels 14 are solid casters, and so the steerable wheel's extreme bottom most dimension can be nominally slightly below that of the casters so that, when the cart is transferred, the steerable wheel is slightly compressed to allow sufficient traction.

The control assembly 24, as shown in FIGS. 1–5, includes controls for powering the cart 10 on and off, for raising and lowering the support surface 20, for controlling the transfer mechanism 30, for driving the cart forward and backward, for stopping the cart in emergencies, and for indicating the remaining battery power. Specifically, a key switch 70 is provided on a side of the control assembly 24, as shown in FIGS. 1–5, and comprises a standard key switch as known in the art. The key switch 70 enables the cart 10 to be powered on and off only by operators possessing the appropriate key. Once the cart 10 is powered on, an operator may turn a lift switch 72 between three discrete positions to move the support surface 20 up, to move the support surface down, or to keep the support surface in a fixed position relative to the cart frame 16. The lift switch 72 is provided on the top of the control assembly 24, as shown in FIGS. 1–5, and comprises a standard switch device as known in the art. Further embodiments of the cart include alternative key switches and/or lift switches for powering the cart and raising/lowering the support surface, such as a lift switch specifically adapted for additional lifting capabilities to list one non-limiting example.

The control assembly 24 also includes control handles 74 that extend outward from opposing sides of the control assembly, as shown in FIGS. 1–5, and that are rotatable relative to the control assembly. The control assembly 24 and control handles 74 provide enough structural strength so that an operator is able to use the control handles to steer the cart 10 during operation and to push/pull the cart when the cart is not driven by the drive wheels 60. During normal operation of the cart 10, the operator rotates the control handles 74, relative to the control assembly 24, to drive the drive wheels 60. The cart 10 is driven forward by rotating the control handles 74 such that the top of the control handles is moved forward, and if the top of the control handles is moved rearward/backward, the cart is driven backward. The control handles 74 are rotatably fixed to one another by a handle shaft that connects the two handles through the control assembly 24. An operator is therefore able to rotate the control handles 74 using only one of the two handles.

The handle shaft is in mechanical communication, through one or more gears, to a potentiometer that measures the direction and amount of rotation of the control handles 74 and sends a signal, either directly or through processing circuitry, to the drive motor to drive the drive wheels 60 the direction and speed intended by the operator. The speed of the drive wheels 60 is dependent upon the amount the control handles are rotated. For example, if the operator rotates the control handles 60 forward a first angular amount the drive wheels will rotate forward at a first speed, and if the operator rotates the control handles forward a second angular amount the drive wheels will rotate forward at a second speed such that a linear relationship exists between the amount of handle rotation and the speed of the drive wheels for both forward and backward rotation. The control handles 74 include a mechanical maximum position that coincides with the maximum drive wheel speed in each direction. The relationship of the handle rotation to drive wheel speed is substantially equivalent for both forward and backward rotation of the control handles 74. In addition, the control assembly preferably includes a speed switch that includes a potentiometer defining two or more discrete positions such that the speed of the cart is increased or decreased by a constant value depending upon the selected position of the speed switch, thereby affording more sensitivity for precise movements of the cart and increased speed for less precise movements of the cart. For example, the discrete positions may correspond to maximum speeds of ¼ mph and ½ mph.

The control handles 74 define a center position wherein the drive wheels are not driven in either direction. The control handles 74 include a spring mechanism that predisposes the control handles to the center position unless an operator exerts a constant force to keep the control handles 74 rotated away from the center position. Similar rotatable handles incorporate torsion springs, as known in the art, to maintain the center position of the handles. Such use of torsion springs may be undesirable because of their propensity to break after repeated use. To address this deficiency, the cart 10 of the present invention includes compression springs attached to a plate that is connected to the handle shaft, such that rotation of the handle shaft causes the springs to contract and expand, thus exerting forces onto the plate and shaft in a rotational direction opposite the direction the operator has rotated the handle shaft. Thus, when an operator releases the control handles 74, the forces provided by the springs will cause the handle shaft to return to the central position. Therefore, the springs and plate provide a much longer useful life for the control handles 74 compared to torsion springs or the like. Further embodiments of the present invention include alternative devices for returning the control handles back to a center position.

The control assembly 24 also includes a stop switch 76 that is located on the side of the control assembly facing the operator. The stop switch 76 allows the cart 10 to immediately stop the drive wheels 60 using the electromechanical brake when the stop switch is pushed to thereby prevent injury to the operator and/or damage to the cart or other surfaces. Situations may arise where the operator is pinned between the cart 10 and another surface, such as a wall, and because the stop switch 76 is the forward-most surface of the cart, the stop switch will preferably be the first surface contacted by the body of the operator, thus stopping the cart from advancing forward further with the intent of preventing or minimizing injury or damage. Further embodiments of the cart of the present invention include alternative and/or additional stop switches to provide for safe operation of the cart. Additional safety components, such as an audio device for indicating motion, are also included in further embodiments of the present invention.

The control assembly 24 also includes a controller 56 for controlling the first and second electric motors 54 and 58 of the transfer mechanism 30. The controller 56 is preferably mounted on the top of the control assembly 24, as shown in FIGS. 1–5. The controller 56 includes discrete switches for actuating the first and second electric motors 54 and 58 and for activating the electromagnet 44; however, further embodiments of the present invention may include a combination controller, such as a joystick or the like, to control the transfer mechanism. Embodiments of the present invention that include the motorized foot under the cart frame for stabilizing the cart may also include one or more switches on the control assembly for operating the one or more motorized feet.

The control assembly 24 includes a battery power indicator to inform an operator as to how much power is remaining so that an operator will know when to charge the cart or if the cart is sufficiently charged. The battery power indicator is preferably mounted on the top of the control assembly 24 such that it is easily viewed by an operator during use; however, further embodiments of the present invention include the indicator at alternative locations. The battery power indicator is an array of LEDs that represent the amount of power remaining in the batteries or an LCD screen that includes a gauge or numeric readout that represents the battery power. Further embodiments of the cart include alternative and/or additional devices for representing the remaining power of the battery. The battery power indicator includes a specific signal, either visual or audio, for indicating that the battery power is below a threshold and charging is recommended.

The battery 28 of the cart 10 of the illustrated embodiments is recharged by removing the battery and charging the battery in a corresponding charger (not shown). Alternatively, the cart may include a retractable plug that can be plugged into a standard 120 volt, 60 Hz power outlet or the like. In such embodiments, a charger is included on the cart to charge the battery. Further embodiments of the present invention provide alternative devices and/or techniques for charging the batteries, such as plugging a charger wire directly to the batteries to list one non-limiting example.

The cart 10 also includes a wiring assembly 78 to which all the electrical components are connected. The wiring assembly 78, as shown in FIGS. 1–2 houses the wiring from the various components, such as the switches of the control assembly 24, the hydraulic pump 32, the drive motor, the battery 28, the transfer mechanism 30, and the like, and houses various circuit boards, breakers, relays, and like, which are necessary to control all of the electrical components of the cart 10. The wiring assembly 78 is mounted at the base of the upright 22 and includes a cover (not shown); however, further embodiments of the present invention may provide the wiring assembly at any location on or within the cart.

Figure 3:
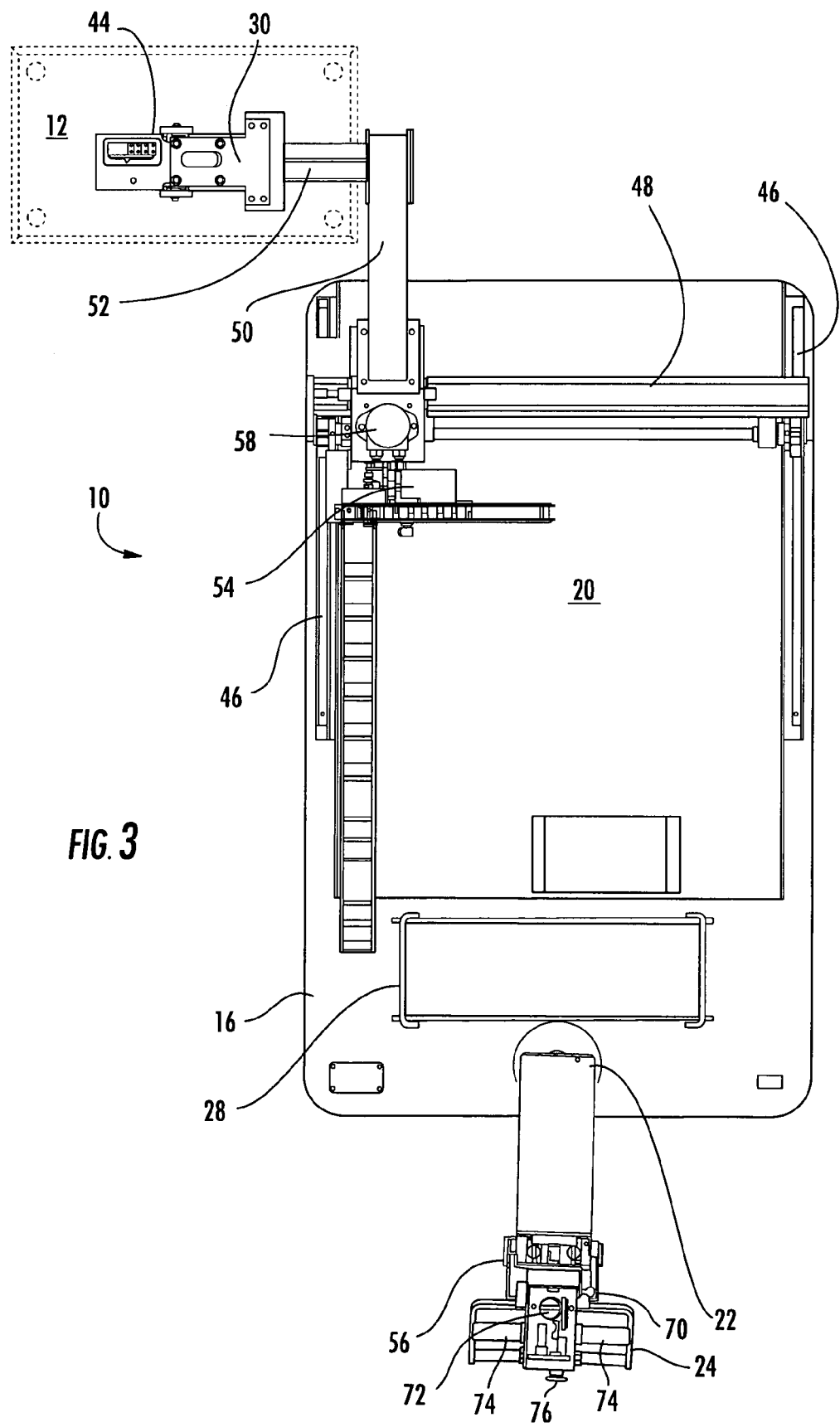
FIG. 3 is a top elevational view of the cart of FIG. 1, illustrating the electromagnet engaging a die that is to be moved laterally and longitudinally to the support surface.

The transfer of a die onto the support surface of the cart is illustrated in FIGS. 3–7. FIG. 3 illustrates the electromagnet 44 engaging a die 12 that is to be moved laterally and longitudinally to the support surface 20. The die 12 of FIG. 3 is represented as being supported by machinery or other surface, and the cart has been moved to be adjacent the machinery or surface and the support surface 20 has been raised to be level with the machinery or surface, such that the die is within reach of the transfer mechanism 30. The feet of the cart 10 are preferably lowered to stabilize the cart. The operator, using the controller 56, moves the electromagnet 44 longitudinally and laterally, using the first motor 54 and second motor 58, respectively, until the electromagnet is substantially positioned above the die 12. The operator, again using the controller 56, activates the electromagnet 44 which magnetically couples to the die 12 and may deflect the electromagnet downward to contact the top surface of the die. Preferably the top surface of the die 12 is substantially free of any connectors, hoses, or the like and is substantially flat to allow a planar connection with the top surface of the die. However, the electromagnet 44 can be mounted to the second arm 52 with a mechanism that allows the electromagnet to "float" or rotate slightly in one or more directions to ensure the electromagnet is seated securely against the surface of the die 12.

Once the electromagnet 44 has engaged the die 12, as shown in FIG. 3, the operator may move the die longitudinally toward the cart 10 by actuating the first motor 54 to move toward the opposite side of the support surface. Although the electromagnet 44 is magnetically coupled to only the upper block of the die 12, the lower block of the die also moves longitudinally because of the guide pins extending from the lower block through the upper block. The sliding of the die is performed at speeds sufficiently slow and over surfaces sufficiently smooth that the guide pins and other surfaces are not damaged by the sliding of the die 12. The electromagnet 44 can have a strength that allows for a pulling force of up to 1,500 pounds or more.

Figure 4:
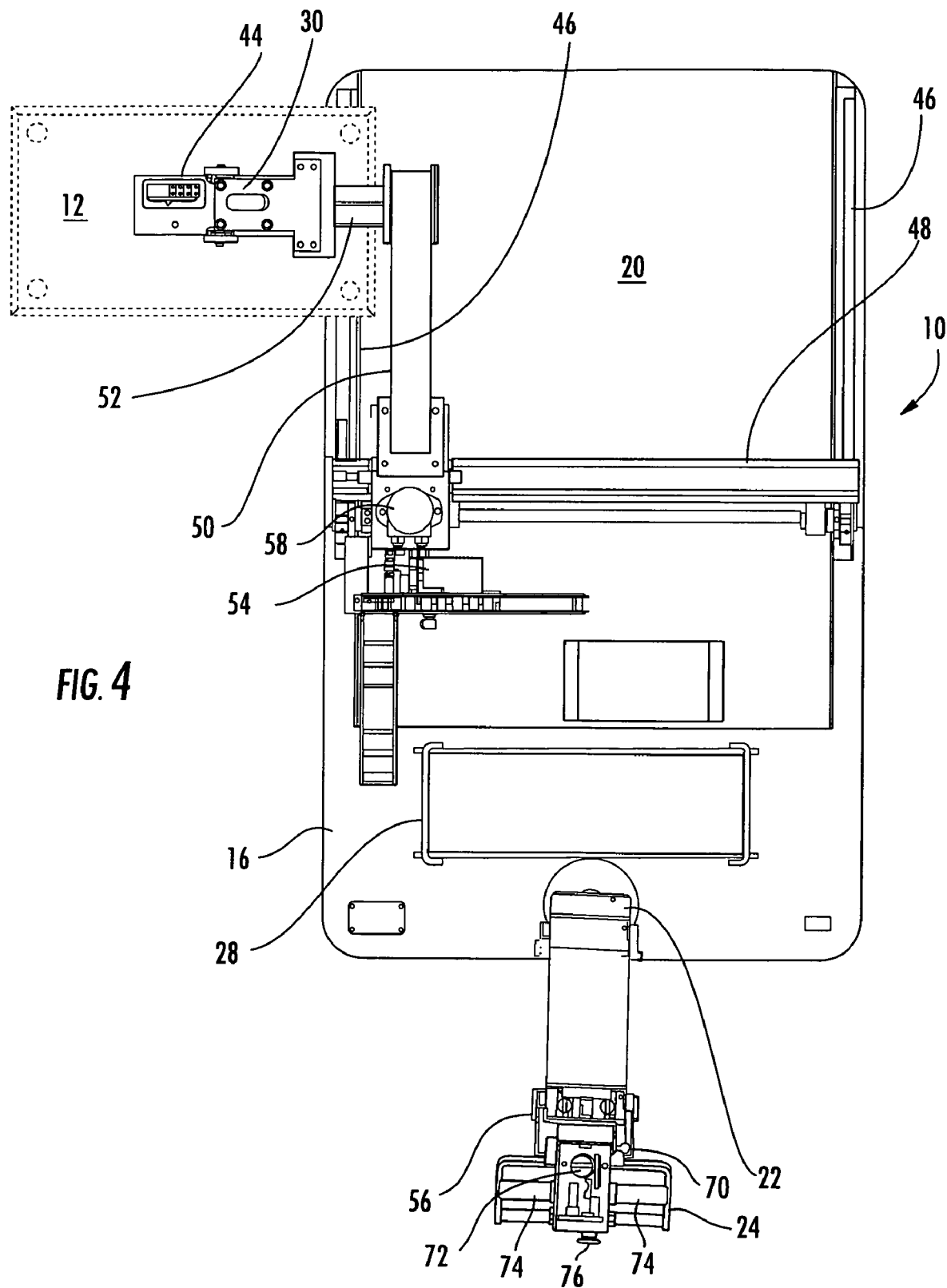
FIG. 4 is a top elevational view of the cart of FIG. 1, illustrating the electromagnet engaging a die that is to be moved laterally to the support surface.
Figure 5:
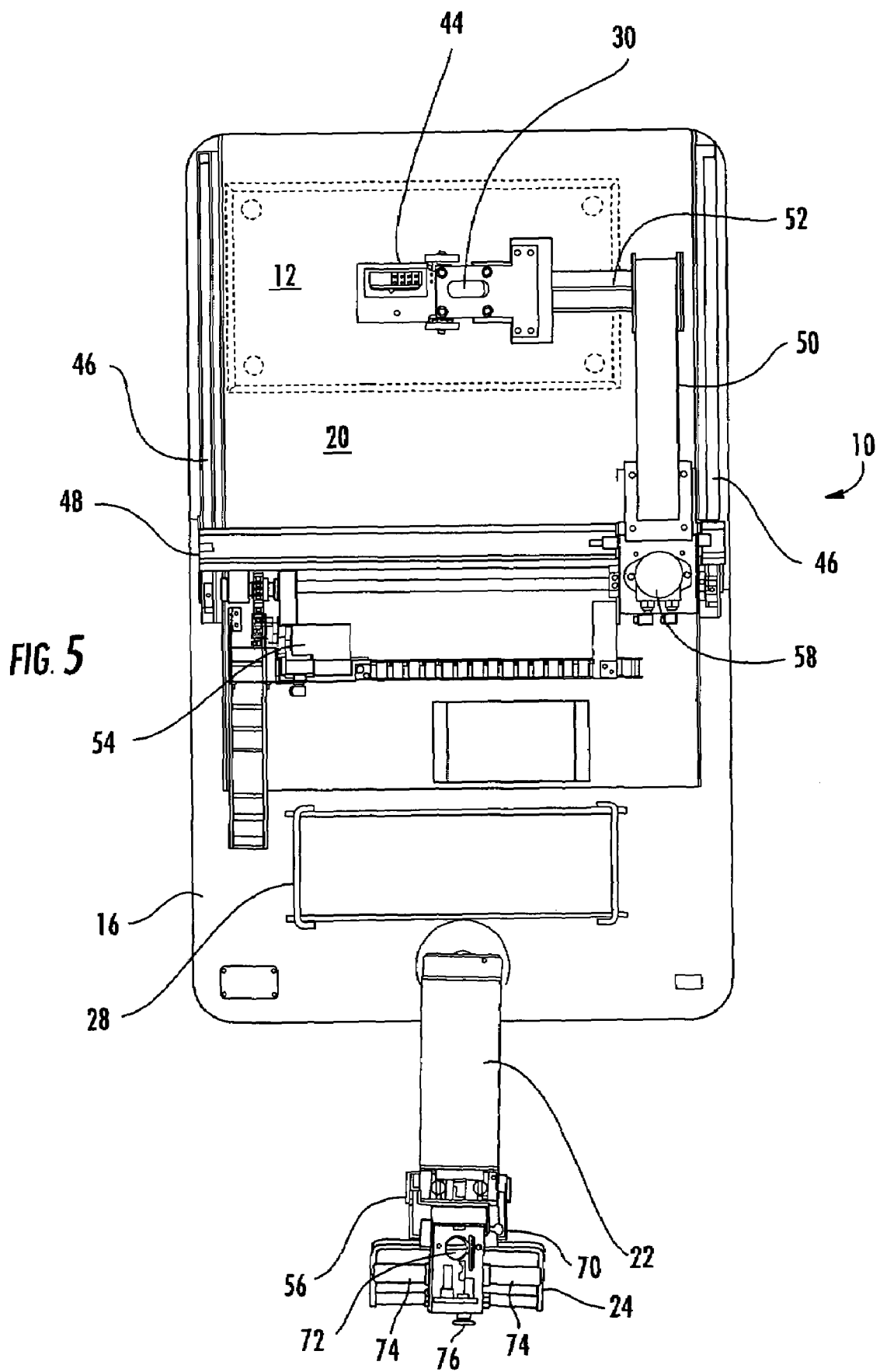
FIG. 5 is a top elevational view of the cart of FIG. 1, illustrating the electromagnet engaging a die that has been moved onto the support surface.

Once the die 12 has been substantially centered in a longitudinal direction, relative to the support surface 20 as shown in FIG. 4, the die is then slid laterally onto the support surface by actuating the second motor 58 to move to the opposite side of the support surface. The die 12 slides laterally in a similar fashion as when it is slid longitudinally, and the die 12 is slid until it is completely supported by the support surface 120, as shown in FIG. 5. At that time, the support surface 20 is lowered and the feet are raised such that the cart can be safely moved to transport the die 12.

Figure 6:
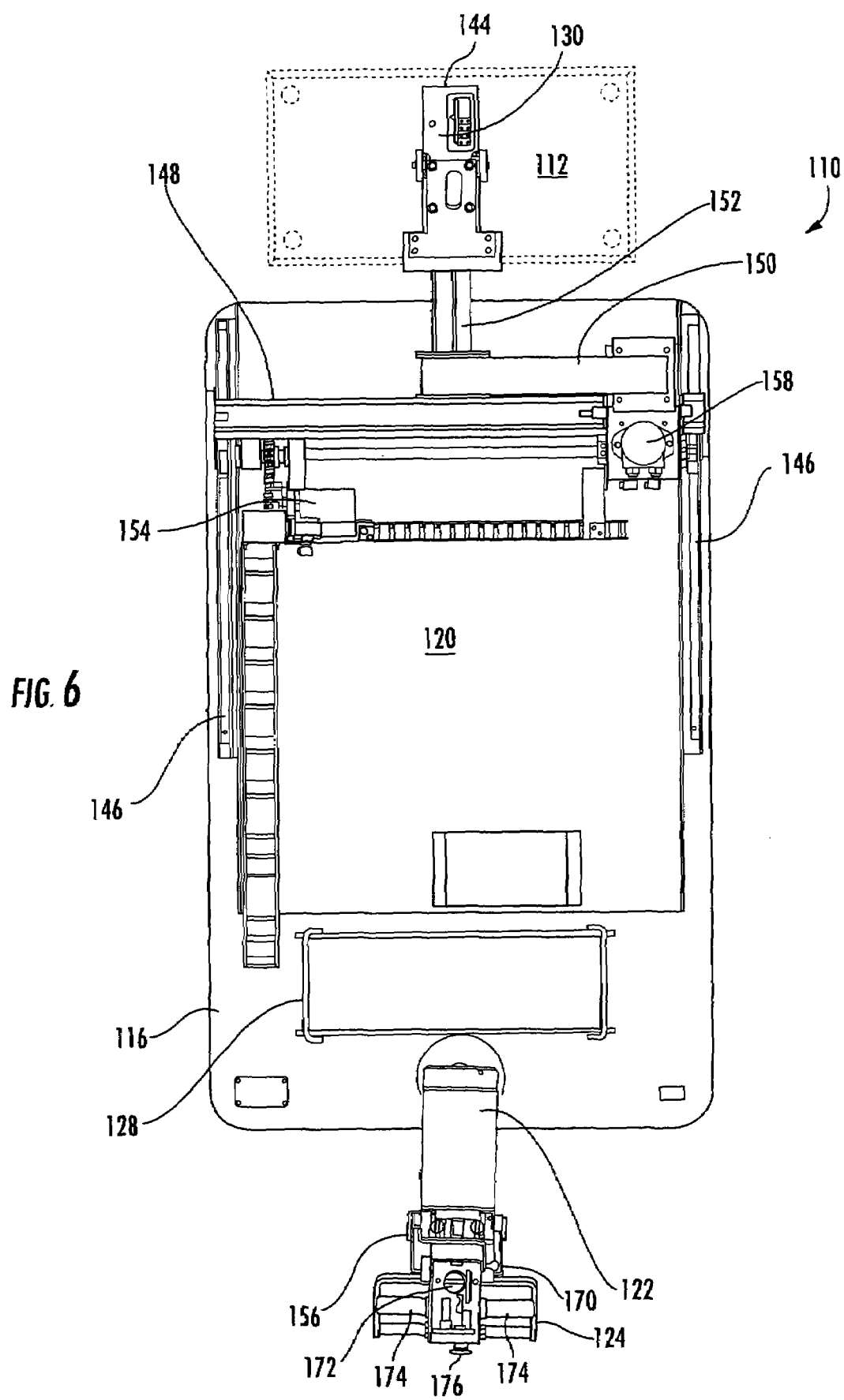
FIG. 6 is a top elevational view of a cart of a second embodiment of the present invention, illustrating an alternative configuration of the first arm and second arm of the transfer mechanism, in which the electromagnet is engaging a die that is to be moved longitudinally to the support surface.
Figure 7:
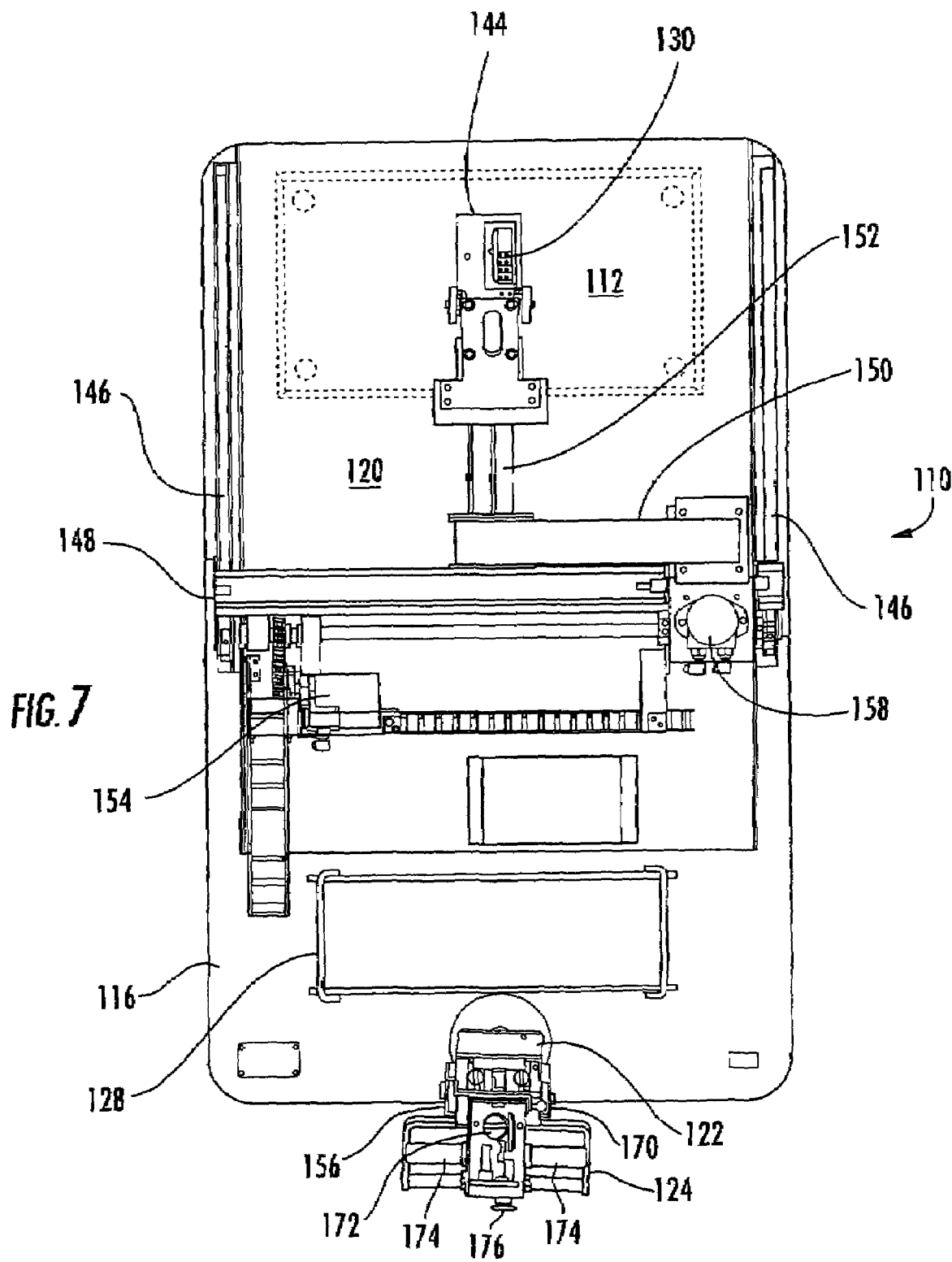
FIG. 7 is a top elevational view of the cart of FIG. 6, illustrating the electromagnet engaging a die that has been moved onto the support surface.
Figure 8:
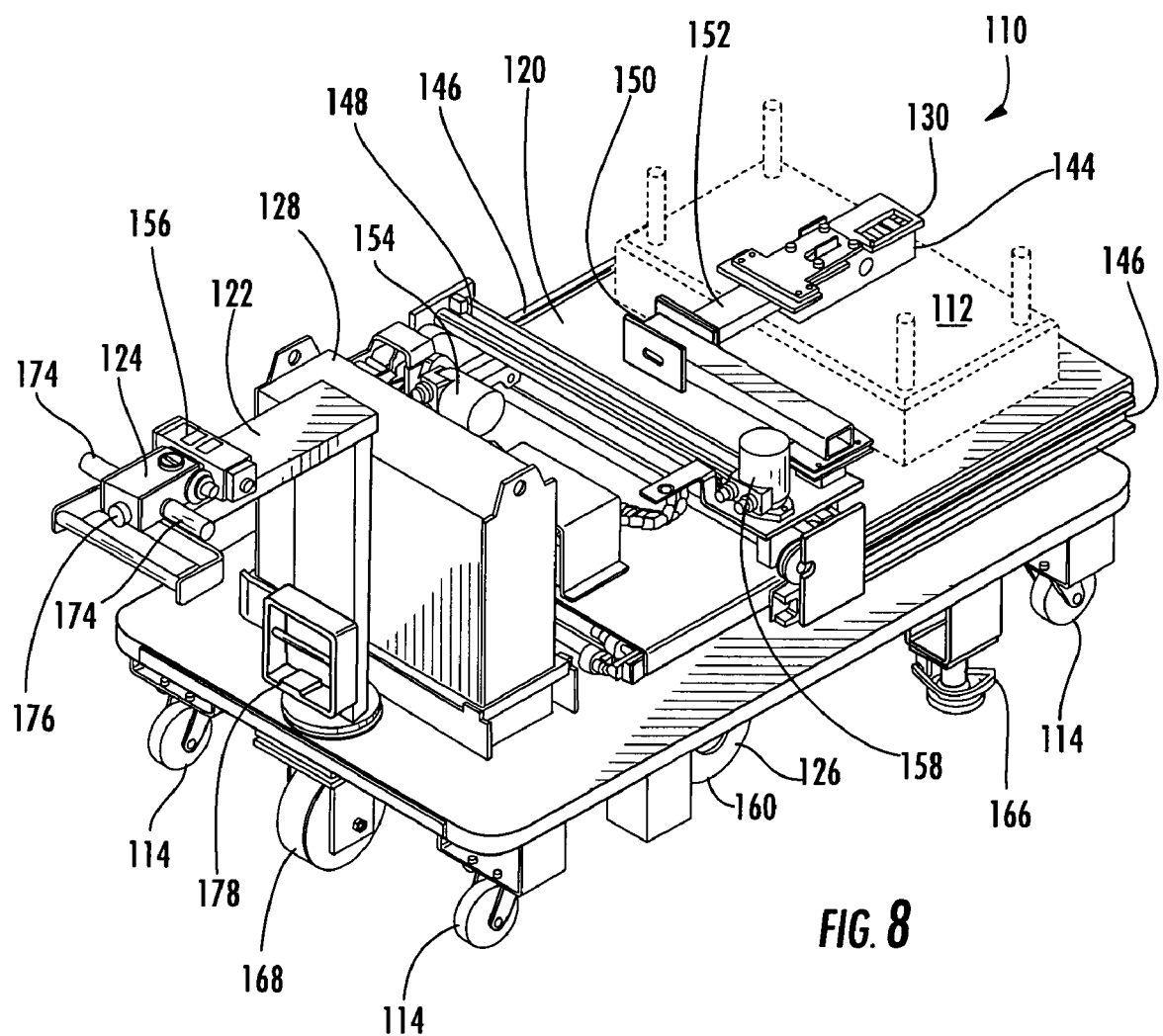
FIG. 8 is a perspective view of the cart of FIG. 6, illustrating the support surface in the downward position and supporting a die.
Figure 9:
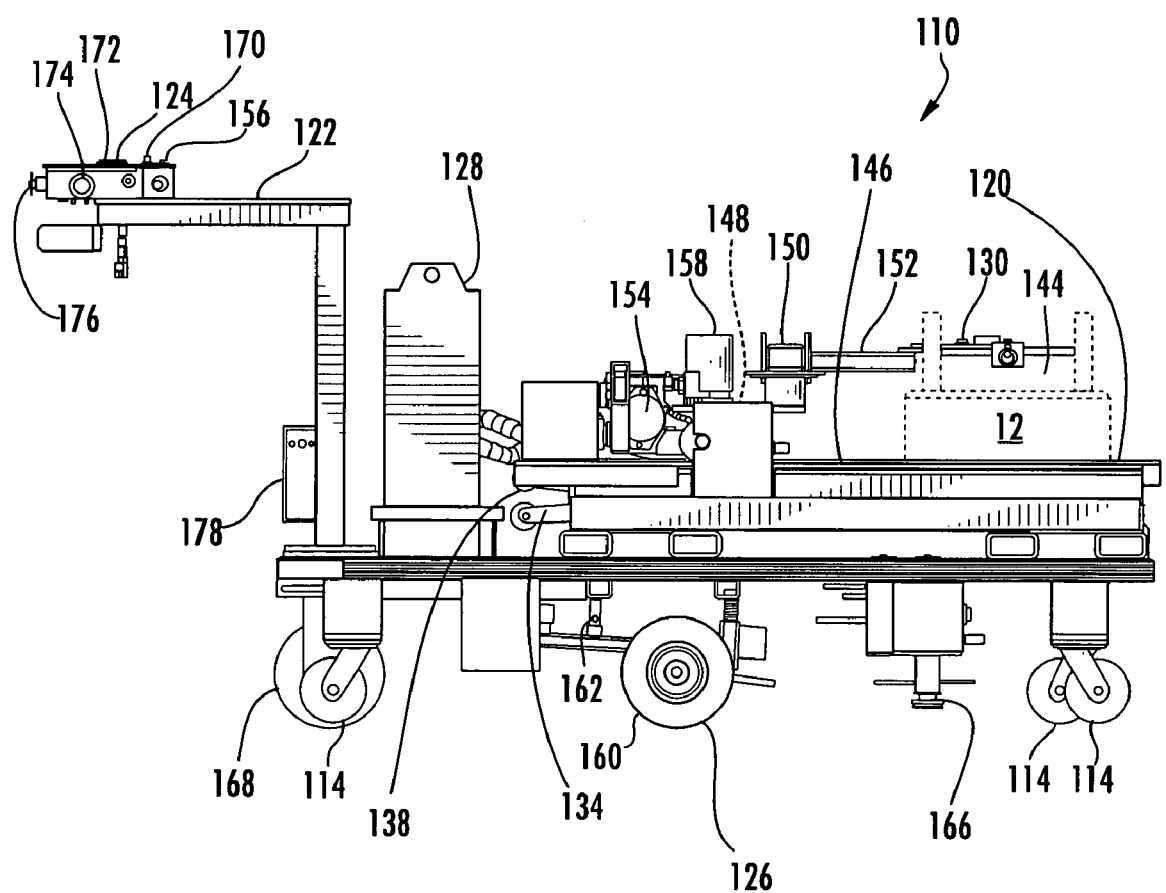
FIG. 9 is a side elevational view of the cart of FIG. 6, illustrating the support surface in the downward position and supporting a die.
Figure 10:
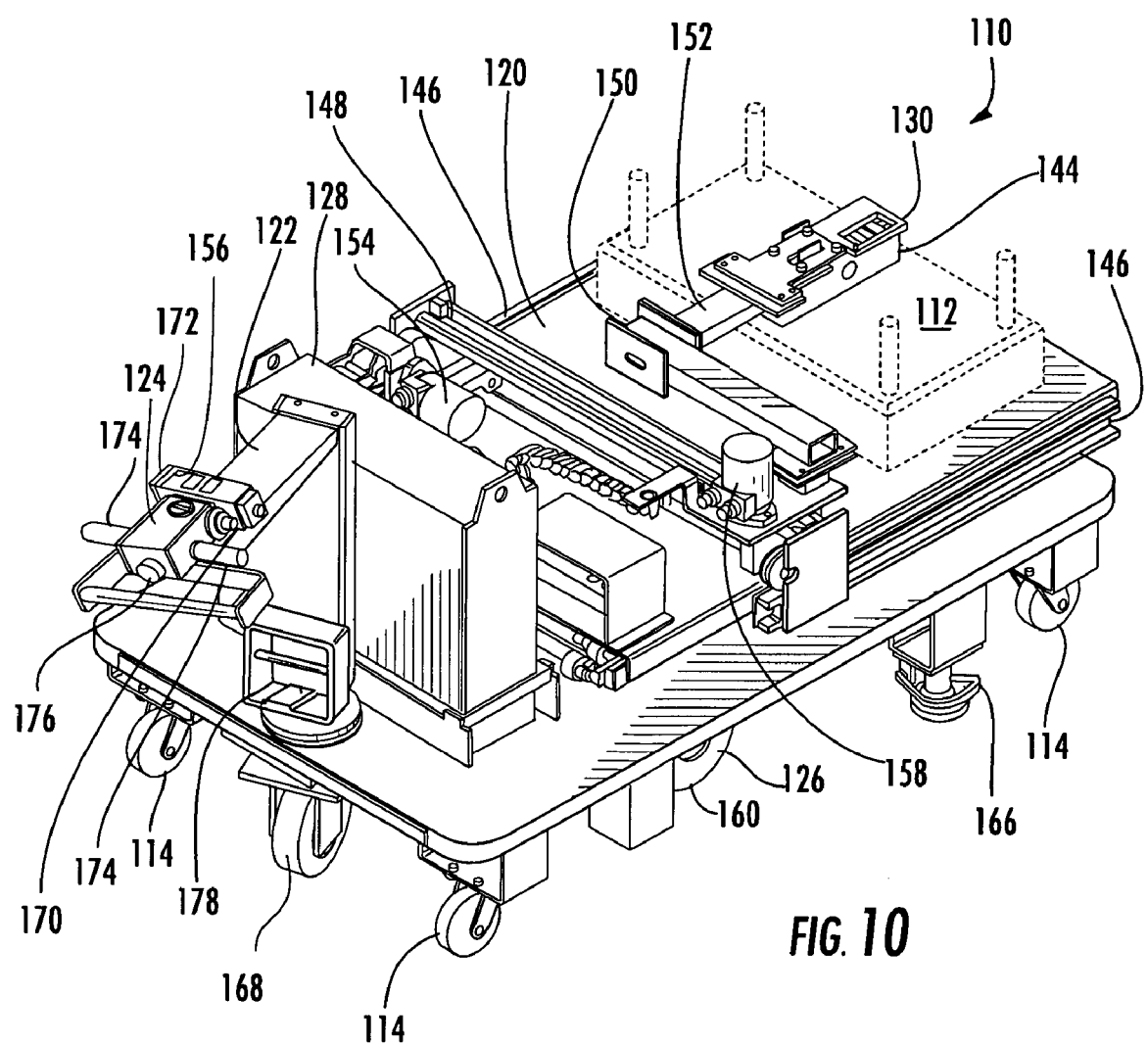
FIG. 10 is a perspective view of the cart of FIG. 6, illustrating the upright and steerable wheel in a turned position.

FIG. 6 illustrates transferring the die 112 according to one embodiment of the present invention. It should be appreciated that the longitudinal follower for the transfer mechanism, which includes wiring harnesses and the like for the transfer mechanism, is illustrated in the unextended position in FIGS. 3 and 6 for illustrative purposes only. The cart 110 of FIG. 6 is positioned adjacent the machinery or surface onto which the die will be transferred. The support surface 120 is raised to be level to the machinery or surface and the electromagnet 144 engages the die. The transfer mechanism 130 slides the die 112 longitudinally by actuating the second motor 158 until the die has been removed from the support surface 120 or as in FIG. 7, the die 112 has been moved longitudinally a maximum distance although it may be partially supported by the support surface in some situations. The die 112 is then slid laterally away from the cart 110 until it is no longer supported by the support surface 120 and is properly positioned on machinery or other surface. The electromagnet 130 is then deactivated to release the die, and the electromagnet is then retracted by actuating the first and second motors 154 and 158 sequentially or simultaneously such that the electromagnet does not contact any portion of the die or corresponding machinery. Further embodiments of the cart of the present invention may be used in similar applications while providing for convenient material handling in similarly difficult conditions.

Figure 11:
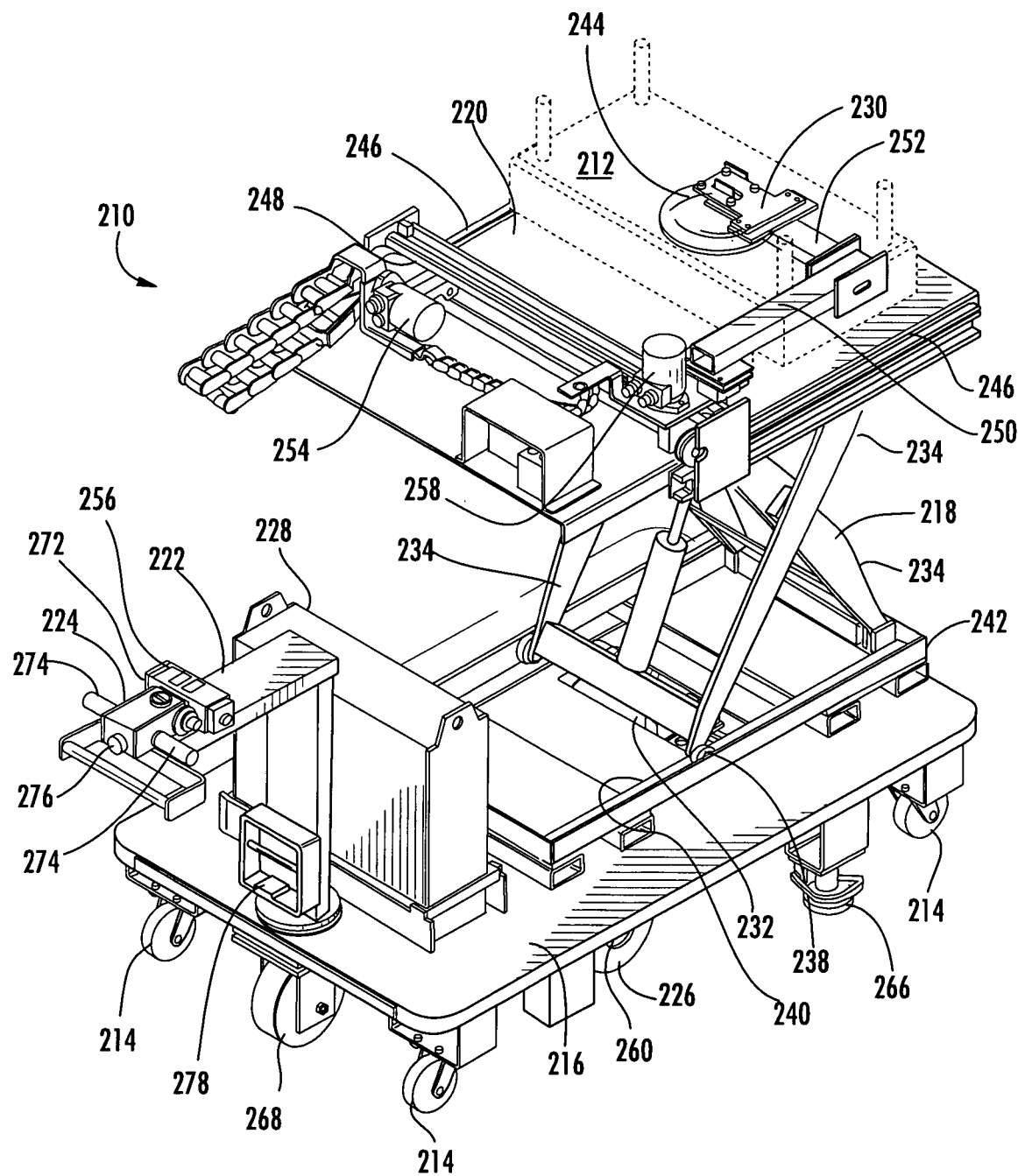
FIG. 11 is a perspective view of a cart of a third embodiment of the present invention, illustrating a suction device for transferring a die from or to the support surface.

FIG. 11 illustrates a third embodiment of the present invention, in which the cart transfer mechanism 230 of the cart 210 includes a suction device 244. The suction device 244 is capable of selectively engaging a die 212 in response to the control assembly 224, or more particularly, in response to the controller 256. The operator, using the controller 256, moves the suction device 244 longitudinally and laterally, using the first motor 254 and second motor 258, respectively, until the suction device is substantially positioned above the die 212 and is contacting the die a sufficient amount to create a vacuum. The operator, again using the controller 256, activates the suction device 244 which couples to the die 212 and may deflect the suction device downward to fully contact the top surface of the die. Preferably the top surface of the die 212 is substantially free of any connectors, hoses, or the like and is substantially flat so that an air-tight suction may be formed between the suction device and the die. In addition, the suction device 244 can be mounted to the second arm 252 with a mechanism that allows the suction device to "float" or pivot slightly in one or more directions to ensure that the suction device is seated securely against the surface of the die 212. The suction device 244 is activated by the control assembly 224 to draw a vacuum and thereby selectively engage the die.

Once the suction device 244 has engaged the die 212, the operator may move the die in a generally longitudinal and/or generally lateral direction toward the cart 210 by actuating the first motor 254 and/or second motor 258 until the die is supported by the support surface 220. Although the suction device 244 is coupled to only the upper block of the die 212, the lower block of the die is also transferred because of the guide pins extending from the lower block through the upper block. The sliding of the die is performed at speeds sufficiently slow and over surfaces sufficiently smooth so that the guide pins and other surfaces are not damaged by the sliding of the die 212. The suction device 244 can have a strength that allows for a pulling force of up to 1,500 pounds or more. The die 212 may also be transferred from the support surface 220 in a generally reverse order.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cart for transporting dies having at least one metallic component and for transferring the dies to or from a die press, said cart comprising:

a cart frame having one or more wheels for allowing the cart frame to move adjacent to or away from the die press;

a support surface connected to the cart frame and structured to support the weight of at least one die;

a control assembly;

a transfer mechanism comprising at least one arm, the transfer mechanism connected to the cart frame and structured to move a die to or from the die press when the transfer mechanism is engaged with the die; and an electromagnet cantilevered from the arm and operatively connected to the transfer mechanism and the control assembly and capable of selectively magnetically engaging a metallic component of a die in response to the control assembly, such that the die can be transferred from or to the support surface relative to the die press.

2. A cart according to claim 1, further comprising a lift mechanism capable of raising and lowering the support surface relative to the cart frame.

3. A cart according to claim 2 wherein the control assembly is operatively connected to the lift mechanism and the electromagnet and capable of controlling both.

4. A cart according to claim 1 wherein the cart frame includes at least one foot capable of stabilizing the cart during transfer of a die.

5. A cart according to claim 1 wherein the transfer mechanism comprises at least one electric motor to move the electromagnet relative to the support surface.

6. A cart according to claim 1 wherein the transfer mechanism comprises a float mechanism that allows the electromagnet to move relative to the die to seat securely against the die when transferring the die.

7. A cart according to claim 1 wherein the cart frame includes a motorized drive wheel assembly.

8. A cart for transporting dies and for transferring the dies to or from a die press, said cart comprising:
- a cart frame having one or more wheels for allowing the cart frame to move adjacent to or away from the die press;
- a support surface connected to the cart frame and structured to support the weight of at least one die, wherein the support surface defines a generally longitudinal direction and defines a generally lateral direction;
- a control assembly; and
- a transfer mechanism connected to the cart frame and operatively connected to the control assembly, the transfer mechanism capable of moving a die, in response to the control assembly, along the longitudinal direction and along the lateral direction relative to the support surface so that;
- the die can be transferred from or to the support surface relative to the die press in both a generally longitudinal direction and a generally lateral direction.

9. A cart according to claim 8, further comprising a lift mechanism capable of raising and lowering the support surface relative to the cart frame.

10. A cart according to claim 9 wherein the control assembly is operatively connected to the lift mechanism and the transfer mechanism and is capable of controlling both.

11. A cart according to claim 9 wherein the lift mechanism comprises a hydraulic cylinder.

12. A cart according to claim 8 wherein the cart frame includes at least one foot capable of stabilizing the cart during transfer of a die.

13. A cart according to claim 8, further comprising an electromagnet operatively connected to the transfer mechanism and the control assembly, wherein the electromagnet is capable of selectively engaging a die in response to the control assembly.

14. A cart according to claim 8 wherein the transfer mechanism comprises at least one electric motor operatively connected to the control assembly.

15. A cart according to claim 8 wherein the cart frame includes a motorized drive wheel assembly.

16. A cart for transporting dies and for transferring the dies to or from a die press, said cart comprising:
- a cart frame having one or more wheels for allowing the cart frame to move adjacent to or away from the die press;
- a support surface connected to the cart frame and structured to support the weight of at least one die, wherein the support surface defines a generally longitudinal direction and defines a generally lateral direction;
- a control assembly; and
- a transfer mechanism comprising at least one arm, the transfer mechanism connected to the cart frame and structured to move a die to or from the die press when the transfer mechanism is engaged with the die; and
- a suction device cantilevered from the arm and operatively connected to the transfer mechanism and the control assembly and capable of selectively engaging a die in response to the control assembly, such that the die can be transferred from or to the support surface relative to the die press.

17. A cart according to claim 16 wherein the transfer mechanism comprises a float mechanism that allows the suction device to move relative to the die to seat securely against the die when transferring the die.

18. A method of transferring a die having at least one metallic component onto a cart to transfer the die to or from a die press, the method comprising the steps of:
- moving the cart adjacent to the die to be transferred, wherein the cart comprises a support surface connected to a cart frame and structured to support the weight of at least one die;
- engaging the die with an electromagnet cantilevered from an arm, the electromagnet operatively connected to a transfer mechanism and a control assembly and capable of selectively magnetically engaging a metallic component of a die in response to the control assembly; and
- transferring the die onto the support surface until the die is completely supported by the support surface.

19. A method according to claim 18, further comprising the step of raising a support surface of the cart until the support surface is substantially level with a surface of the die press on which the die is positioned prior to transferring the die onto support surface.

20. A method according to claim 18, further comprising the step of lowering at least one foot of the cart to stabilize the cart prior to transferring the die.

21. A method according to claim 18 wherein transferring the die comprises transferring the die in a generally longitudinal direction and a generally lateral direction.

22. A method according to claim 18 wherein moving the cart adjacent the die comprises controlling a motorized drive wheel assembly operatively connected to the control assembly.

* * * * *